United States Patent [19]

Robinson

[11] 4,102,395
[45] Jul. 25, 1978

[54] PROTECTED WELL SCREEN

[75] Inventor: Wiley B. Robinson, Dayton, Tex.

[73] Assignee: Houston Well Screen Company, Houston, Tex.

[21] Appl. No.: 768,972

[22] Filed: Feb. 16, 1977

[51] Int. Cl.² ............................................ E21B 43/08
[52] U.S. Cl. .................................... 166/231; 166/234
[58] Field of Search .............. 166/230, 231, 232, 233, 166/234, 236

[56] References Cited

U.S. PATENT DOCUMENTS

| 1,305,915 | 6/1919 | Mack | 166/236 |
| 1,341,755 | 6/1920 | Minton | 166/230 |
| 1,995,850 | 3/1935 | Harter | 166/235 |
| 2,342,913 | 2/1944 | Williams et al. | 166/230 |
| 2,344,909 | 3/1944 | Williams et al. | 166/224 |

FOREIGN PATENT DOCUMENTS

| 32,322 | 6/1927 | France | 166/233 |

Primary Examiner—James A. Leppink
Attorney, Agent, or Firm—Jennings B. Thompson

[57] ABSTRACT

The well screen assembly disclosed includes a perforated pipe joint having a well screen mounted internally of the pipe joint. The well screen includes a plurality of rods positioned parallel to and spaced from the longitudinal axis of the pipe joint with an elongated wire helically wrapped around the outside of the rods and positioned between the rods and the inside wall of the pipe joint. The wire is wrapped so that the spaces between the wire screen solid particles out of the well fluid as the fluid flows between the slots in the wire into the inside of the well screen. The well screen is spaced from the inside surface of the pipe joint to allow fluid to flow freely around the outside of the well screen after the fluid passes through the perforations in the pipe joint. Means are provided to mount the screen in the pipe joint and to retain gravel, in the space between the well screen and the inside surface of the pipe joint, if the screen is gravel packed.

2 Claims, 4 Drawing Figures

PROTECTED WELL SCREEN

This invention relates to well screen assemblies that include a well screen that is supported by a perforated pipe joint and in particular to well screen assemblies of the protected type wherein the well screen is mounted inside the perforated pipe joint.

U.S. Pat. No. 2,342,913, which issued Feb. 29, 1944, discloses a well screen assembly of the type to which this invention relates. The advantages of this type screen assembly is that the screen itself is located inside the perforated pipe joint so that the pipe joint provides protection to the screen while the well screen assembly is being lowered into the well bore to the desired position. This type assembly is also advantageous when it is necessary to remove the screen from the well bore since the well screen is protected by the pipe joint from damage by the wash over pipe commonly used to face a well screen for removal from a well bore.

In the well screen assembly disclosed in the above-referenced patent, the longitudinal rods to which the helical coils of wire are attached are located between the coils of wire and the inside surface of the perforated pipe joint. The pipe joint is heat shrunk upon the rods which places an indeterminate amount of compressive stress initially on the coils of wire forming the screen. This reduce the ability of the coils to withstand the collapse forces placed on the coils by the differential pressures existing across the screen. This arrangement also limits the flow path between the perforated pipe joint and the screen to the space provided by the distance between the rods and the coils of wire. In fact the fluid must flow to the screen between adjacent parallel longitudinal rods that provide channels through which the fluid must flow. Fluid cannot flow freely around the screen, which is an important consideration, since as the screen remains in the well bore it tends to begin to be plugged up by solid particles wedged between adjacent coils. This reduces the porosity of the well screen and it is important that the fluid be free to move to the areas of the screen that remain open.

Well screens are made of corrosion resistant materials, such as stainless steel. The perforated pipe joints are made of carbon steel. At every point of contact between such dissimilar metals electrolytic corrosion will probably occur, and, rapidly in the presence of water. The encrustation due to the products of such electrolytic corrosion will quickly plug the screen openings and the flow channels between the rods.

Well screens are used in certain problem wells, particularly those having sandy, loose, or unconsolidated production zones, whether oil, gas or water. In these type wells it is common practice to not only use a well screen assembly but to also pack gravel tightly around the well screen to help support the unconsolidated producing formation and to help screen out the solid particles of the formation that are carried into the well bore by the fluid that migrates into the well bore from the producing zone. It is important in gravel packed well screens that the gravel be tightly packed from the wall of the well bore all the way to the helical wires forming the screen. In the well screen assembly disclosed in the above-identified patent, the narrow channels defined by the longitudinally extending rods, the wires forming the screen, and the inside surface of the perforated pipe joint would tend to cause the gravel entering these flow channels through the perforations to bridge and fail to fill the space between the wire and the inside surface of the pipe joint resulting in an incomplete gravel pack.

Therefore, it is an object of this invention to provide an improved well screen assembly of the protected type wherein the screen is mounted inside a perforated joint of pipe with the longitudinal rods located inside the helical coils of wire forming the screen so that the contact between dissimilar metals occurs only where the screen is supported in the pipe joint.

It is a further object of this invention to provide a well screen assembly of the protected type wherein the well screen is spaced from the inside surface of the perforated pipe joint in which it is located a sufficient distance to allow this space to be completely filled with gravel during a gravel pack operation.

It is a further object of this invention to provide a well screen assembly of the protected type wherein the well screen is spaced from the inside surface of the pipe joint to allow the fluid passing through the perforated joint to freely flow to all areas of the well screen.

These and other objects, advantages and features of this invention will be apparent to those skilled in the art from the consideration of this specification, including the attached drawings and appended claims.

IN THE DRAWINGS

Figure 1:
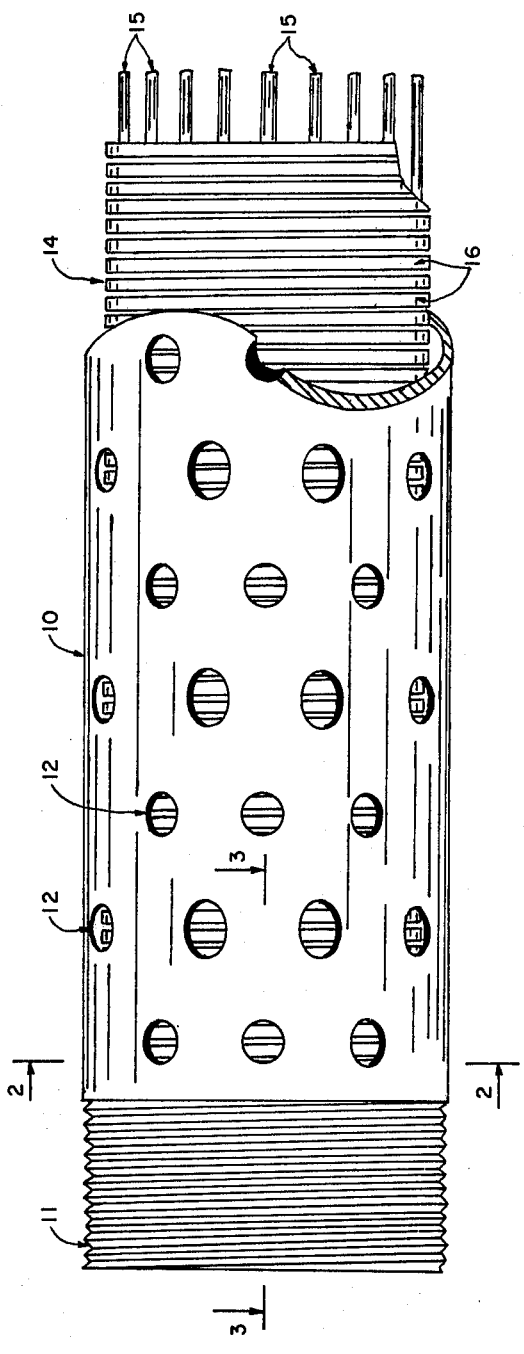
FIG. 1 is a view in elevation of a section of the preferred embodiment of the well screen assembly of this invention with a portion of the perforated pipe joint broken away to show the well screen located inside the perforated joint.
Figure 2:
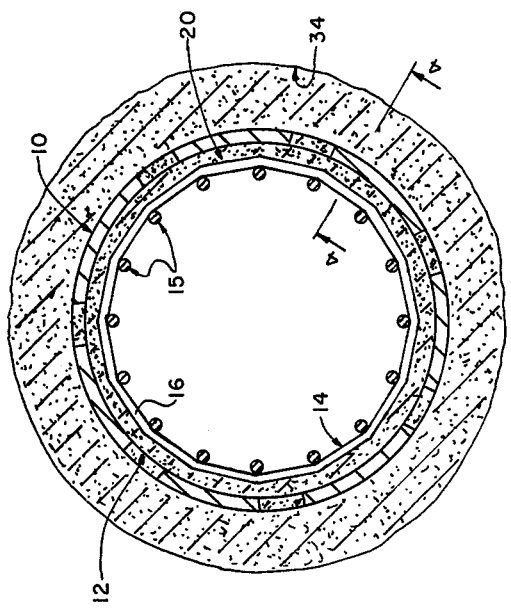
FIG. 2 is a sectional view taken along line 2—2 of FIG. 1 after the well screen has been positioned in a well bore and gravel packed around the well screen.

The well screen assembly of this invention includes perforated pipe joint 10. It has threads 11 on each end for connecting the assembly to the apparatus used to position the screen assembly in the well bore. The pipe joint is provided with a plurality of perforations 12 through which fluid from a producing formation can pass into the bore of the pipe joint.

Positioned inside the pipe joint is well screen 14. The well screen includes a plurality of rods 15 that extend parallel to each other and parallel to and generally equally spaced from the longitudinal axis of the pipe joint. Wire 16 is wrapped around the rods in spaced helical coils in the conventional manner in which well screen is manufactured so that the wire coils are located between the rods and the inside surface of the pipe joint. The wire can either be welded to the rods at each point of contact to form what is called a welded well screen or lugs can be extruded from the wire as it is wrapped around the rods to space the adjacent coils of wire the desired distance apart.

Figure 3:
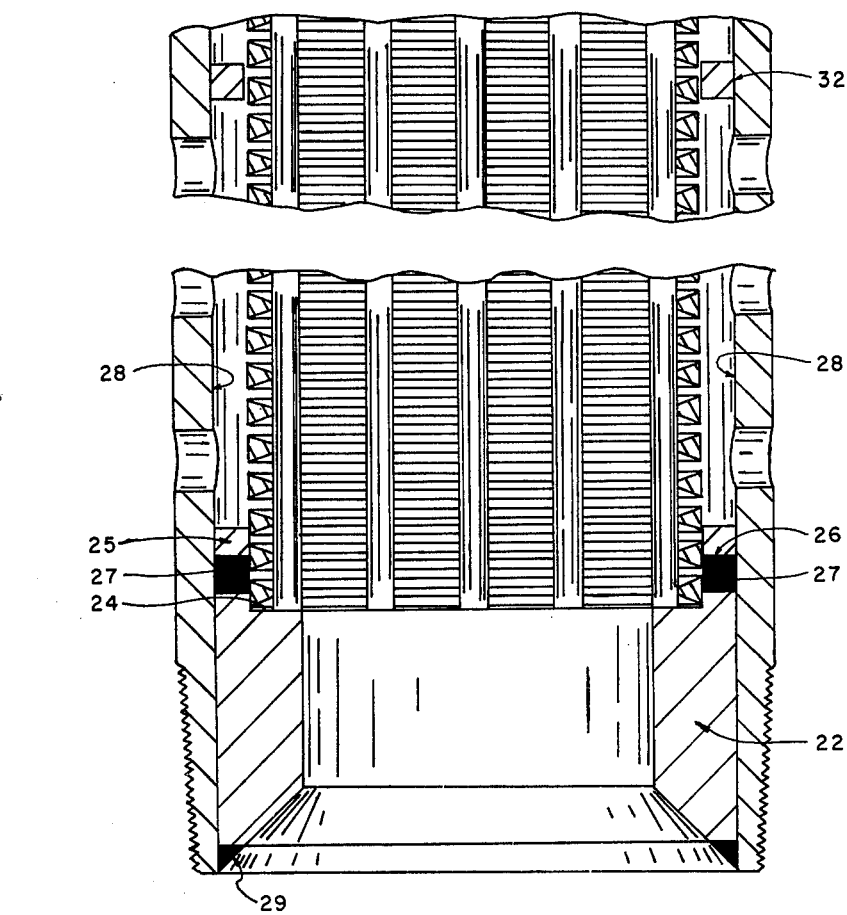
FIG. 3 is a sectional view taken along line 3—3 of FIG. 1.

Means are provided to mount the screen in the perforated pipe joint so that the screen is spaced a preselected distance from the inside surface of the pipe joint. This provides an annular space indicated by the number 20 through which fluid flowing through the perforations in the pipe joint can freely flow around the outside surface of the well screen. Also gravel can be placed in the space if the well screen assembly is gravel packed in position in the well bore. In the embodiment shown the means for mounting the well screen in the pipe joint is shown in FIG. 3. It includes annular member 22 having bore 23 of increased diameter to provide shoulder 24 to engage the end of the screen and upwardly extending annular portion 25 that extends over a portion of the screen adjacent its end to space the screen uniformly from the inside of the pipe joint. A plurality of holes 26 are located in portion 25 through which the screen can be attached to members 22 by welds 27. The outside diameter of the screen formed by the rods and the wire is pre-selected so that the space between the screen and the inside surface 28 of the pipe joint is the desired distance. This distance will vary depending upon the down hole conditions, type of producing formation, etc. If the screen is to be packed with gravel, the space provided will depend to some extent on the size of the gravel to be used. Gravel sizes range from around .015 to about 0.100 in diameter and, although it is referred to as gravel, it consists usually of large diameter grains of sand. The space should be such that there will be no likelihood of the gravel bridging as it moves into and fills up the annular space between the screen and the inside surface of the pipe joint.

The diameter of annular member 22 is such that it will fit snugly in the inside bore of pipe joint 10 as shown in FIG. 3. As shown in FIG. 3, annular weld 29 attaches member 22 to the pipe string. The clearance between member 22 and the pipe joint is such that no gravel can escape from space 20 by passing between the two. This is also prevented by weld 29. The other end of the well screen is mounted in the same manner in the pipe joint so that the well screen is securely mounted in the pipe joint. If the well screen assembly is unusually long it may be desirable to locate spacers, such as annular ring 32, along the length of the screen. This will insure that the screen stays properly spaced from the pipe joint so that annular space 20 is generally uniform throughout the length of the assembly so that a uniform flow area is provided for the fluid.

With the screen spaced from the pipe joint over its entire length and electrically connected to the pipe joint only through annular mounting member 22 at each end, electrolytic corrosion can occur adjacent the ends of the screen only. Such corrosion will extend longitudinally of the screen only for about 3 diameters so only a small percent of the screen will be affected. Also, encrustation in the space between the screen and the pipe joint due to the products of electrolytic corrosion will be limited to this same short distance from each mounting member.

Figure 4:
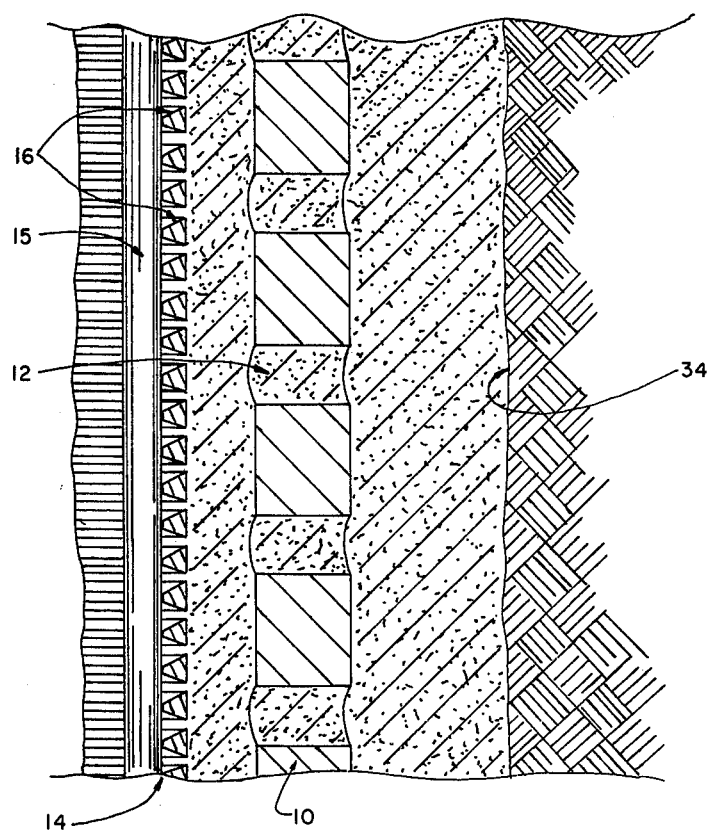
FIG. 4 is a sectional view taken along line 4—4 of FIG. 2.

FIG. 4 is a section through a well screen assembly of the type shown in FIG. 1 with gravel packed between the pipe joint and producing formation 34. This figure illustrates how the space 20 will also be compacted with gravel so that a uniform gravel section will extend from the outside surface of the screen through the perforations and between the pipe joint and the surface of the producing formation.

From the foregoing, it will be seen that this invention is one well adapted to attain all of the ends and objects hereinabove set forth, together with other advantages which are obvious and which are inherent to the apparatus and structure.

It will be understood that certain features and sub-combinations are of utility and may be employed without reference to other features and sub-combinations. This is contemplated by and is within the scope of the claims.

As many possible embodiments may be made of this invention without departing from the scope thereof, it is to be understood that all matter herein set forth or shown in the accompanying drawings is to be interpreted as illustrative and not in a limiting sense.

The invention having been described, what is claimed is:

1. A well screen assembly for use in a gravel-packed section of a producing well comprising a pipe joint having a plurality of perforations in its side wall through which fluid can flow, a well screen positioned inside the pipe joint, said screen including a plurality of elongated rods positioned inside the pipe joint parallel to and spaced from the longitudinal axis of the joint, said rods being arranged in a circle, a length of wire helically wrapped around the rods in spaced-apart turns to provide slots between adjacent wraps to screen solid particles from the fluid flowing through the slots, and means engaging the upper and lower ends of the screen for mounting the screen in the pipe joint with the screen spaced from the inside wall of the pipe joint to provide an annular space between the screen and the inside wall of pipe joint over substantially its entire length and electrically connected to the pipe joint only through the mounting means to allow fluid passing into the pipe joint through the perforations to flow freely around the screen in the annular space and to allow gravel when pumped around the outside of the well screen to fill the annular space between the well screen and pipe joint, said mounting means closing the annular space adjacent the upper and lower ends of the screen to hold the gravel in position in the annular space between the screen and the inside wall of the pipe joint.

2. The well screen assembly of claim 1 in which the mounting means includes annular members positoned in the pipe joint, each member having an annular surface for engaging the ends of the rods to hold the screen in place in the joint and an annular skirt extending over a portion of the screen between the screen and the pipe joint to hold the screen spaced uniformly from the inside of the pipe joint to provide an annular space of substantially uniform width between the screen and the pipe joint.

* * * * *